Oct. 16, 1962 W. D. HALL 3,059,078
THERMOSTAT FOR COOLING SYSTEMS
Filed Aug. 28, 1959

INVENTOR.

William D. Hall

United States Patent Office 3,059,078
Patented Oct. 16, 1962

3,059,078
THERMOSTAT FOR COOLING SYSTEMS
William D. Hall, Montgomery County, Md.
(5112 Westpath Court, Washington 16, D.C.)
Filed Aug. 28, 1959, Ser. No. 836,652
9 Claims. (Cl. 200—122)

This invention relates to thermostats for cooling systems, and more particularly to thermostats for use with air conditioners, large electric fans and the like. These devices are herein referred to generically as "cooling systems" even though they include ventilating or circulating fans which in fact do not actually cool the space ventilated.

Heretofore, the thermostat for an air conditioner has been a rather expensive and large device even though simple, inexpensive thermal switches of adequate current carrying capacity have been available. These inexpensive switches are characterized by resilient switch blades each supported at one end thereof and having a contact at the other end. A thermal element moves one of the blades and separates the contacts when the temperature falls. These switches have a disadvantage in that when used on an air conditioner the heavy current drawn by the compressor motor heats the resilient blades so much that the thermal element is heated by ten or more degrees. Hence, once the thermostat closes the circuit to the air conditioner, the room temperature must drop in excess of ten degrees before the thermostat will reopen the circuit. This has rendered the simple thermal switches impractical for air conditioners. If the resilient blades are made larger to reduce the self-heating thereof, the bimetallic strip or other thermal element must be made larger, and if all this is done the thermostat soon becomes large and cumbersome, with the ultimate loss of the advantage of the simple thermostat.

In my prior copending application Serial No. 662,683, filed May 31, 1947, entitled Control Device for Fans; and in the prior copending application of George G. Edlen and Leo Dumire, Serial No. 766,507, filed October 10, 1958, entitled Thermostatic Control for Fans, the latter application being assigned to me, there is shown a portable thermostat that is normally not sold as part of an electric fan but can be readily attached to one as well as connected in series therewith to control the fan.

Since, the filing of the first of said two copending applications, several portable thermostats have come on the market designed for use on air conditioners. These devices avoid the heating difficulties mentioned above by using expensive switches which require a large bimetal strip to operate them. This makes the control knob and its operating arrangement complex. These thermostats are not designed to be mounted on the air conditioner but upon the wall, and are hence not in the path of any air being circulated. In view of their entire construction these thermostats are not only expensive but not especially accurate.

It is an object of my invention to provide a thermostat for cooling systems that is inexpensive and yet accurate.

It is a further object of my invention to provide a thermostat for cooling systems that is more accurate than previously commercially available devices for this purpose.

It is a further object of my invention to provide a simple inexpensive thermostat that can be used in conjunction with air conditioners that do not have a built-in thermostat and which will control the room temperature with reasonable accuracy.

Figure 1:
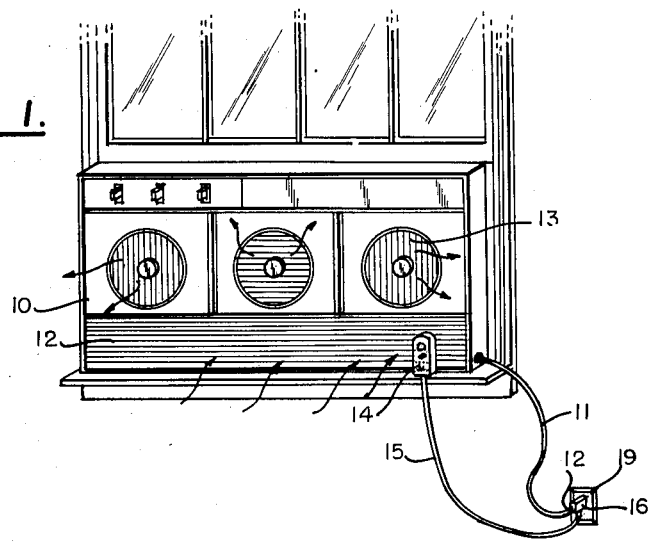
FIGURE 1 shows a conventional air conditioner with the new thermostat installed thereon.

In FIGURE 1, I have illustrated a conventional window unit type of room air conditioner 10, for example, one rated at 7½ amperes. It has a conventional line cord 11 having a wall plug 12. It has the usual compressor motor (not shown) fed by the line cord, and it also has a circulating fan which draws air to be cooled into grill 12 and exhausts the cool air from grill 13. If this air conditioner is one of the cheaper models it may not have a built-in thermostat. If the owner of the air conditioner should decide to add a thermostat he may employ the device of this invention, to be described below.

The new thermostat has a casing 14 having a two-wire line cord 15 and a series plug 16. The series plug is conventional and represents nothing new, so far as this application is concerned, and comprises prongs 17 and a socket 18. The upper one of prongs 17 is directly connected to the upper one of socket elements 18. The lower one of prongs 17 is connected to the lower one of wires 15 and the lower one of socket element 18 is connected to the upper one of wires 15. The plug 17 is adapted to be inserted in a wall outlet 19 (FIGURE 1) and the plug 12, on the end of line cord 11, is adapted to be received by the socket 18.

Figure 2:
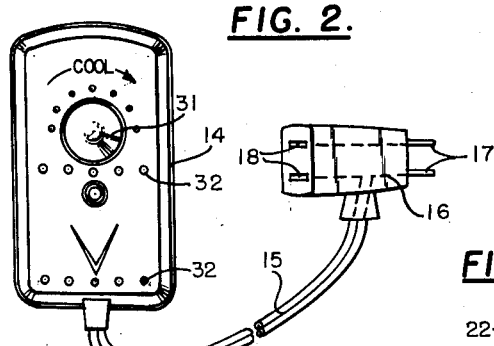
FIGURE 2 is a front view of the thermostat.
Figure 3:
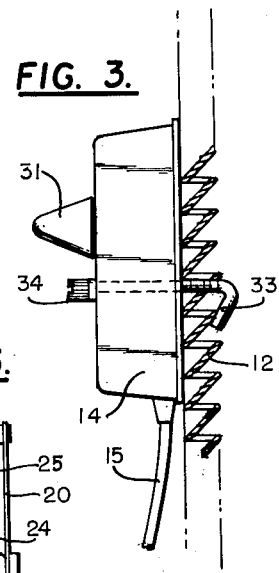
FIGURE 3 is a side view of the thermostat showing it mounted on the intake grill of an air conditioner.
Figure 5:
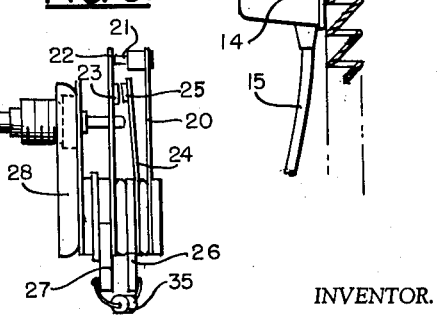
FIGURE 5 is a side view of the thermal switch.
Figure 4:
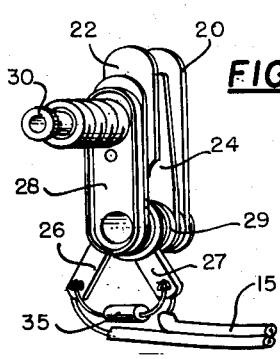
FIGURE 4 is a perspective view of a conventional thermal switch, but with the novel improvement of a resistor added thereto.

Inside of casing 14 is the thermal switch and resistor shown in FIGURE 4. The thermal switch includes a bimetallic strip 20 having a tab 21 of insulating material that bears on resilient blade 22 which carries contact 23. A second resilient blade 24 carries a second contact 25. The blade 21 is in direct electrical contact with terminal 26 and the blade 24 is in direct electrical contact with terminal 27. The blades 21 and 24, the bimetallic strip 20 and the front frame 28 are interconnected mechanically and insulated electrically by the connecting means 29. A front shaft 30 is threaded and upon being rotated by the knob 31 (see FIGURES 2 and 3) will move in and out and vary the position of blade 24 and thus change the temperature setting of the thermostat. Thermal switches embodying parts 21 to 30 inclusive are very well known in the commercial market and are shown in further detail in the aforesaid Edlen and Dumire application. For use on fans and air conditioners such a thermal switch should be constructed to close its contacts when heated and open them when cooled, and this is followed in connection with this invention.

Thermal switches constructed as aforesaid have been used on fans in the past; but in the case of air conditioners they are inaccurate. When the large current drawn by the compressor motor of the air conditioner flows through the thin resilient switch blades 22 and 24, heat is generated which is transmitted to the bimetallic strip 20 in substantial quantity. In the case of some commercially available thermal switches this heating is over ten degrees for a 7½ ampere air conditioner. This means that the thermostat runs ten degrees warmer when the air conditioner is running than when it is turned off. As a result, once the air conditioner is started the self-heating in the switch 22—25 is so great as to practically hold the thermal switch closed indefinitely or at least until the room temperature drops well over ten degrees.

When the thermostat is mounted on the wall, the aforesaid self-heating may be reduced by a small amount by perforating the casing and rows of holes 32 are shown in the front thereof. Similar holes are in the rear of the casing, but the error may still be ten degrees or even more due to the self-heating of the switch.

To improve the air flow through the casing and thus reduce the self-heating, I mount the thermostat casing 14 directly on the grill 12 of the air conditioner 10, instead of on the wall. To provide such mounting I employ the J-bolt or hook 33 which extends from the rear of the casing and hooks onto the grill 12. A nut 34 is used to clamp bolt 33 to the grill as more fully shown and described in said Edlen and Dumire application.

Even with the casing 14 mounted directly on the grill 12 of the air conditioner, the self-heating of the switch blades 22 and 24 results in serious inaccuracy of the thermostat. This invention overcomes the above difficulty mainly by adding a small inexpensive carbon resistor 35 of say 39,000 ohms across the switch terminals 26 and 27. The metallic leads of this resistor transmit the heat generated by resistor 35 by metallic conduction to the terminals 26 and 27 which in turn will transmit the heat to the bimetallic strip 20.

If the heat transmitted to the thermal element 20 of the thermal switch when the contacts are open is about equal to that part of the heat generated in the switch per se (mainly blades 22 and 24) which is transmitted to the bimetallic strip 20 when the contacts are closed, the inaccuracy above mentioned will be corrected. In other words, the bimetallic strip 20 will be heated by say eight degrees by the switch blades when the contacts are closed and by eight degrees due to resistor 35 when the contacts are open. As a result, the thermostat will hold the room temperature quite constant even though the actual working parts of the thermostat are quite inexpensive.

While the aforesaid thermostat requires a warm-up time of a few minutes when started for the first time, this can be avoided thereafter by always turning the air conditioner on and off by rotating the thermostat knob 31. Under these circumstances the thermostat comprising the present invention will hold the room temperature far more constant than the portable plug-in wall thermostats now on the market and intended to serve the same purpose as is served by the device of this invention.

Best results are secured if resistor 35 has wires of substantial length connecting it to terminals 26 and 27 as some time lag in the heating has been found to be preferable.

For greatest accuracy, the mounting of the thermostat in the air intake stream, the size and number of perforations 32, the size of resistor 35 and the length of its leads, are all to be related to the amount of self-heating in the switch blades.

The thermostat herein described is much more sensitive and accurate than would be the case if the switch baldes were made large enough to avoid self-heating. Moreover, the thermostat herein described is much smaller and lower in cost than a similar unit that has switch blades large enough to avoid self-heating.

In connection with certain electric fans the self-heating in the switch blades may be helpful rather than harmful. In other fans the self-heating in the switch blades may be neither helpful nor harmful. In conection with still other electric fans, the addition of resistor 35 may be a helpful improvement. However, the resistance value would usually be higher in a device designed for use on a fan than for one designed for use on an air conditioner.

I claim to have invented:

1. A thermostat for an air circulator comprising a thermal switch which is located in the path of the air set up by said air circulator and which closes the circuit therethrough when heated and opens the circuit therethrough when cooled, said thermal switch being subject to substantial heating due to the current flow therethrough, and means for heating the thermal switch when the circuit therethrough is open to at least partly compensate for the heat generated in the thermal switch.

2. A thermostat for cooling systems comprising a switch, means for connecting the switch in series with the cooling system to be controlled, a thermal element adapted to be placed in the space to be cooled and which when heated closes said switch and when cooled opens said switch, said switch being subject to substantial heating due to the current flow therethrough and being in close proximity to the thermal element so that the latter is adversely heated, and an electrical heater shunted across said switch for heating said thermal element when the switch is open to at least partly compensate for the adverse heating of said thermal element by said switch.

3. A thermostat for an air conditioner having a compressor motor comprising a thermal switch adapted to be placed in the space to be cooled and which closes when heated and opens when cooled, means connecting the thermal switch in series with said motor, said thermal switch being composed of parts having sufficient resistivity that they are self-heated by the flow of current to said motor when the switch is closed, and means for supplying heat to the thermal switch when it is open to at least partially compensate for the erroneous operation arising from the aforesaid self-heating of the switch.

4. A thermostat for cooling systems comprising a switch, which is subject to substantial heating due to the current flowing therethrough, means for connecting the switch in series with the cooling system, a thermal element adapted to be located in the space to be cooled for closing said switch when the element is heated and opening the switch when the element is cooled, said thermal element being in close proximity to said switch and affected by the heat generated therein, a resistor, and means for transmitting the heat developed in said resistor primarily by conduction to said thermal element, to at least partly compensate for the effect on said thermal element of the heat generated in said switch, said last-named means including wires shunting said resistor across said switch.

5. In a thermostat for an air conditioner that has a compressor motor and air circulating means that has an air intake for the air to be cooled and an air outlet for the air that has been cooled, a switch comprising a air of blades of resilient material, said blades being fixed at one end and having complementary contacts at their other ends, a thermal element which when heated closes the contacts and when cooled opens the contacts, means connecting said blades in series with said compressor motor so that the contacts will control the compressor motor, said blades having sufficient resistivity and being in such close proximity to said thermal element that heat is generated in the blades and transferred to said element, mounting means for said blades and said element to position at least one of them in the direct path of air flow to said air circulating means whereby to carry away part of the heat generated in said blades and reduce the undesirable effect of such heat on said element, and resistor means shunted across said switch and in heat transfer relation with said thermal element for compensating at least partially for the heating of said thermal element by the current flow through said blades.

6. A thermostat for an air conditioner that has an air intake for the air to be cooled and an air outlet for the cool air comprising a perforated casing including means for attaching it to the air conditioner and in the path of the air passing into said air intake, a two-wire line cord leaving said casing and terminating in a series plug, a thermal element mounted in said casing, at least one resilient blade moved by said thermal element, electrical switch means including a contact mounted on said blade and a second complementary contact, said contacts and blade being in series with the two wires of said cord, said series plug having prongs adapted to be inserted in a wall outlet and having a socket to receive the plug of the air conditioner, said prongs, line cord, blades, contacts and socket being in series whereby the current drawn by the air conditioner passes through said blade, said blade having such resistivity that the current flow to the air conditioner passing therethrough generates heat therein and being in such close proximity to said thermal element that the latter receives a substantial part of such heat and thereby does not accurately respond to the temperature conditions of the air passing thereby, the perforations in said casing allowing sufficient air flow therethrough to carry away at least some of the heat which contributes to the aforesaid inaccuracy of response and a resistor across said contacts and in heat transfer relation with said thermal element to at least partially compensate for said inaccuracy of response.

7. A thermostat as defined in claim 6 including means for transferring at least part of any heat developed in said resistor primarily by conduction to said thermal element, said last-named means including wires connecting said resistor across said contacts.

8. In a thermostat for an air conditioner that has a compressor motor and air circulating means that has an air intake for the air to be cooled and an air outlet for the air that has been cooled, thermally operated electrical switching means, including a thermal sensitive element for de-energizing the compressor motor when the temperature drops and energizing said motor when the temperature rises, means connecting said thermally operated electrical switching means in series with said compressor motor, said thermally operated electrical switching means having sufficient resistivity as to be significantly heated by the flow of current therethrough to said compressor motor and thereby raise the thermal sensitive element of the thermally operated electrical switching means significantly above the temperature of the air at said intake, said thermal sensitive element being located in the path of air entering said air intake so as to reduce the effect of the heating of the thermally operated switching means due to the flow of current therethrough to the compressor motor, and a resistor in parallel with the thermally operated switching means and arranged to supply heat to the thermal sensitive element when the circuit through the thermally operated switching means is broken to at least partially compensate for error due to the heat generated in the thermally operated switching means itself.

9. In combination, an air conditioner having a compressor motor and air circulating means having an air intake and an air outlet, a thermal switch located in the path of air entering said intake, and which opens the circuit therethrough when the temperature falls and closes the circuit therethrough when the temperature rises, said thermal switch being connected in series with the compressor motor and being subject to self-heating due to the flow of current therethrough and means for supplying heat to the thermal switch when it is open to at least partially compensate for erroneous operation arising from the aforesaid self heating of the switch.

References Cited in the file of this patent

UNITED STATES PATENTS

| | | |
|---|---|---|
| 1,701,757 | Lea | Feb. 12, 1929 |
| 2,225,975 | Bruce | Dec. 24, 1940 |
| 2,235,697 | Cornell | Mar. 18, 1941 |
| 2,565,638 | Victory | Aug. 28, 1951 |
| 2,811,610 | Bletz | Oct. 29, 1957 |